United States Patent [19]

Amann et al.

[11] 3,862,165

[45] Jan. 21, 1975

[54] NEW 2-IMINO-5-METHYLENETHIAZOLIDINES

[76] Inventors: August Amann, 30 Parkstrasse; Horst Koenig, 4 Neuwiesenstrasse, both of, 6700 Ludwigshafen; Peter Thieme, 4 Mutterstadter Graben, 6701 Ruchheim, all of Germany

[22] Filed: Sept. 21, 1972

[21] Appl. No.: 291,097

[52] U.S. Cl. ........ 260/306.7 T, 260/552 R, 424/270
[51] Int. Cl. ............................................. C07d 91/18
[58] Field of Search .................. 260/306.7, 306.7 T

[56] References Cited
UNITED STATES PATENTS

| | | | |
|---|---|---|---|
| 2,739,971 | 3/1956 | Sawdey et al. | 260/306.7 |
| 2,796,402 | 6/1957 | Kluge et al. | 260/306.7 |
| 3,228,954 | 1/1966 | Durham et al. | 260/306.7 |

Primary Examiner—R. Gallagher
Attorney, Agent, or Firm—Johnston, Keil, Thompson & Shurtleff

[57] ABSTRACT

2-imino-5-methylenethiazolidines which are substituted on the imino nitrogen and may bear further substituents on the ring. These substances have therapeutic, e.g. anti-inflammatory, properties.

8 Claims, No Drawings

NEW 2-IMINO-5-METHYLENETHIAZOLIDINES

This invention relates to new substituted 2-imino-5-methylenethiazolidines having valuable pharmacological properties.

The new compounds in the form of the free bases have the formula

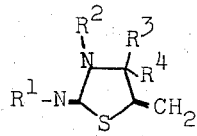

where $R^1$ denotes acyl,
$R^2$ denotes hydrogen or lower alkyl,
$R^3$ denotes hydrogen or lower alkyl,
$R^4$ denotes hydrogen or alkyl of up to 8 carbon atoms, and
$R^3$ and $R^4$ may together denote spirocycloalkyl-$(CH_2)_{4 \text{ to } 6}$ or spirobicycloalkyl -$C_nH_{2n-2}$ where $n$ is one of the integers 6, 7 and 8.

When $R^2$ denotes hydrogen the 2-imino-5-methylenethiazolidine may be present in its tautomeric form, i.e. as 2-aminothiazoline:

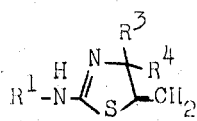

For the purposes of this invention, lower alkyl is taken to mean linear or branched alkyl of up to 5 carbon atoms. Examples are methyl, ethyl, propyl, isopropyl, butyl, tert-butyl. The preferred meaning of $R^4$ is 4-methyl-n-pentyl. The acyl radicals may be derived from aliphatic or aromatic carboxylic acids, e.g. from acetic acid, benzoic acid and chlorobenzoic acid, or from a monocarboxylic acid ester. Specific examples of acyl are ethoxycarbonyl, benzoyl, 4-chlorobenzoyl and 3,4,5-trimethoxybenzoyl. The preferred joint meaning of $R^3$ and $R^4$ is the pentamethylene chain attached spirocyclically to the thiazolidine ring. Spirocycloalkyl-$(CH_2)_{4 \text{ to } 6}$ is taken to mean rings having 5 to 7 members including the spiro carbon atom. Spirobicycloalkyl-$C_nH_{2n-2}$ with $n$ denoting 6 to 8 is taken to mean bicycloalkyl attached spirocyclically to the thiazolidine ring, e.g. norbonyl.

The new thiazolidines can be prepared in a manner known as such (N. R. Easton, D. R. Cassady and R. D. Dillard, J.Org.Chem. 29, 1851 (1964)) from isothiocyanates and appropriately substituted propargylamines. If the process is carried out at temperatures below 20°C (e.g. in ether as solvent), there may be isolated the corresponding thioureas, which however can be cyclized to form the thiazolidines even at room temperature.

For the preparation of the new compounds it is also possible to choose the reverse route which consists in reacting an amine of the formula

with an isothiocyanate of the formula

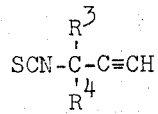

to give a compound of the formula

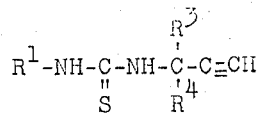

and then effecting cyclization.

Usually the isothiocyanate is added at room temperature to a solution of the amine in any solvent, e.g. benzene, methylene chloride, tetrahydrofuran and particularly lower aliphatic alcohols. The reverse order in combining the reactants is also possible. Then heating under reflux is effected until, usually after 1 to 5 hours, an evaporated sample does not show an isothiocyanate band in the infrared spectrum. After removal of the solvent at subatmospheric pressure the products can be purified by recrystallization or distillation. The structures are determined by analysis, by means of the infrared spectrum and particularly by means of the NMR spectrum (two exo-methylene protons at $\delta = 5.0$ to $5.4$ ppm). When benzene is used as the reaction medium there may sometimes be formed, in addition to the thiazolidine, up to 25% of the isomeric dihydrothiazine, which can be recognized in the NMR spectrum by its olefinic protons.

Separation of the two substances by crystallization or distillation is difficult; polar organic liquids are therefore preferred as reaction medium.

The substituted 2-imino-5-methylenethiazolidines and their pharmaceutically useful salts have valuable pharmaceutical properties.

The new thiazolidines have for example anti-inflammatory, anti-bacterial and antifungal properties. When used in a dose of 1 to 5 mg/kg the new compounds lower the blood pressure in normal animals.

The anti-inflammatory properties have been determined by the method of C. A. Winter, G. A. Risky and G. W. Nuss, Proc. Soc. exp. Biol. Med. 111 (1962) 544 ff. In this method there is produced in the hind foot of the rat, by injecting carrageenin, an inflammatory swelling which can be inhibited or prevented by anti-inflammatory substances. The new substances bring about an inhibition of edema of about 50% when administered perorally in a dose of 50 mg/kg.

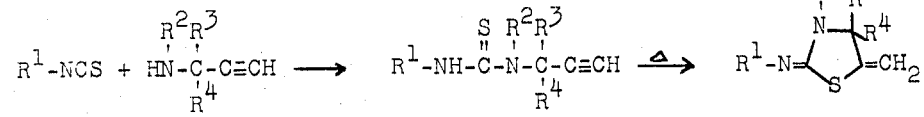

Cyclization usually occurs in the range of about 30°C to about 80°C, but temperatures outside this range may also be used.

Some of the new compounds also have a remarkable analgesic effect. Mention should also be made of the sodium-diuretic effect of some of these compounds.

An example of a compound having an analgesic effect is the compound of Example 3 below ($R^1$ = $H_5C_2OCO$, $R^2$ = H, $R^3$ = $CH_3$, $R^4$ = H). When administered perorally to the mouse in a dose of 50 mg/kg there is a significant increase in the response time in the hot-plate and hot-beam tests; in the benzoquinone test the compound is effective in a dose of as little as 25 mg/kg. When administered in these doses the compound does not produce any symptoms of toxicity. For example, when it is administered to the mouse in a dose of 215 mg/kg, the revolving-rod test does not reveal any impairment of coordination.

Another advantage of the new compounds is that they exhibit little toxicity in the case of both peroral and parenteral administration.

Pharmaceutically useful salts are the salts of inorganic and organic acids, e.g. hydrochloric acid, sulfuric acid, phosphoric acid, tartaric acid and maleic acid.

The invention is further illustrated by the following Examples.

| Example | $R^1$ | $R^2$ | $R^3$ | $R^4$ | Melting or boiling point (°C) | Yield (%) | Obtained analogously to Example |
|---|---|---|---|---|---|---|---|
| 1. | benzoyl | H | $CH_3$ | $CH_3$ | 110 to 111 | 55 | 3 |
| 2. | 4-chlorobenzoyl | H | $CH_3$ | H | 158 to 160 | 58 | 3 |
| 3. | exthoxycarbonyl | H | $CH_3$ | H | 120 to 122 | 66 | 3 |
| 4. | ethoxycarbonyl | H | $(-CH_2-)_5$ | | 130 to 133 | 25 | 3 |
| 5. | 3,4,5-trimethoxybenzoyl | H | $CH_3$ | $CH_3$ | 159 to 162 | 31 | in acetonitrile |

We claim:

1. New 2-imino-5-methylenethiazolidines of the formula

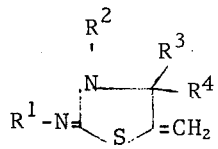

where
$R^1$ denotes RCO- and R denotes methyl, phenyl, chlorophenyl, 3,4,5-trimethoxyphenyl or ethoxy,
$R^2$ denotes hydrogen or lower alkyl,
$R^3$ denotes hydrogen or lower alkyl,
$R^4$ denotes hydrogen or alkyl of up to 8 carbon atoms, or $R^3$ and $R^4$ together denote spirocycloalkyl-$(CH_2)_4$ to $_6$ or spirobicycloalkyl-$C_nH_{2n-2}$ where $n$ is one of the integers 6, 7 and 8, and their pharmaceutically useful salts.

2. Compounds as claimed in claim 1 with $R^2$ denoting hydrogen in their tautomeric 2-amino-5-methylenethiazoline form

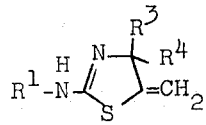

and their pharmaceutically useful salts.

3. Compounds of the formula of claim 1 where $R^4$ is 4-methyl-n-pentyl.

4. Compounds of the formula of claim 1, where $R^3$ and $R^4$ together form the pentamethylene radical.

5. Compounds of the formula of claim 4 where $R^1$ is ethoxycarbonyl.

6. Compounds of the formula of claim 5 where $R^2$ is hydrogen.

7. Compounds of the formula of claim 6 where $R^3$ is alkyl of 1 to 3 carbon atoms and $R^4$ is hydrogen.

8. Compound of the formula of claim 7 where $R^1$ is ethoxycarbonyl, $R^2$ is hydrogen, $R^3$ is methyl and $R^4$ is hydrogen.

* * * * *

UNITED STATES PATENT AND TRADEMARK OFFICE
CERTIFICATE OF CORRECTION

PATENT NO. : 3,862,165
DATED : January 21, 1975
INVENTOR(S) : August Amann, H. Koenig, & Peter Thieme It is certified that error appears in the above-identified patent and that said Letters Patent are hereby corrected as shown below:

In the heading insert --[73] Assignee: Badische Anlin - & Soda-Fabrik Antiengesellschaft; Ludwigshafen/Rhine--;

Column 3, line 25, delete "exthoxycarbonyl" and insert --ethoxycarbonyl--.

Signed and Sealed this fourteenth Day of October 1975

[SEAL]

Attest:

RUTH C. MASON
Attesting Officer

C. MARSHALL DANN
Commissioner of Patents and Trademarks